United States Patent
Patel et al.

(10) Patent No.: US 12,450,174 B2
(45) Date of Patent: Oct. 21, 2025

(54) ALLOCATING SESSIONS ASSOCIATED WITH EXCLUSIVE ACCESS TO DIFFERENT FIBERS OF A STORAGE TARGET

(71) Applicant: International Business Machines Corporation, Armonk, NY (US)

(72) Inventors: Kushal S. Patel, Pune (IN); Gandhi Sivakumar, Bentleigh (AU); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 18/222,264

(22) Filed: Jul. 14, 2023

(65) Prior Publication Data
US 2025/0021491 A1   Jan. 16, 2025

(51) Int. Cl.
G06F 3/06       (2006.01)
G06F 12/14      (2006.01)
H04L 67/1097    (2022.01)

(52) U.S. Cl.
CPC .. *G06F 12/1416* (2013.01); *G06F 2212/1052* (2013.01)

(58) Field of Classification Search
CPC .............. G06F 12/1416; G06F 2212/1052
USPC ....................................................... 726/29
See application file for complete search history.

(56) References Cited

U.S. PATENT DOCUMENTS

| | | | | |
|---|---|---|---|---|
| 7,299,332 | B1 * | 11/2007 | Misra | G06F 9/5016 711/170 |
| 7,539,711 | B1 * | 5/2009 | Pothapragada | H04L 65/613 |
| 7,716,406 | B1 * | 5/2010 | Tyndall | G06F 13/387 710/316 |
| 8,301,811 | B1 * | 10/2012 | Wigmore | G06F 3/0635 710/29 |
| 9,910,618 | B1 * | 3/2018 | Curley | G06F 11/2071 |
| 10,409,838 | B1 * | 9/2019 | George | G06F 3/0635 |
| 10,983,964 | B1 * | 4/2021 | Bono | G06F 3/0659 |

(Continued)

FOREIGN PATENT DOCUMENTS

EP      1246060 A1    10/2002

OTHER PUBLICATIONS

Vladimir V. Riabov; Storage Area Networks (SANs) Storage Area Networks (SANs); Rivier College; Year:2003; pp. 1-11.*

(Continued)

*Primary Examiner* — Monjur Rahim
(74) *Attorney, Agent, or Firm* — Zilka-Kotab, P.C.

(57) ABSTRACT

A computer-implemented method, according to one embodiment, includes receiving, from a plurality of initiators, a plurality of reservation requests for logical unit numbers (LUNs) of a storage target. Exclusive type network paths between the initiators and the LUNs requested in the reservation requests are caused to be added to a restricted path list. The method further includes determining the initiators of the plurality of initiators, that have access to at least one of the exclusive type network paths in the restricted path list. Session logout commands are caused to be sent to the determined initiators. The session logout commands instruct the determined initiators to thereafter re-log in to sessions that are logged out of as a result the determined initiators adhering to the session logout commands. The method further includes allocating a first session that a first of the determined initiators re-logs in to, to a first fiber.

20 Claims, 5 Drawing Sheets

(56) References Cited

U.S. PATENT DOCUMENTS

| | | | |
|---|---|---|---|
| 11,005,935 B1* | 5/2021 | Littlefield | G06F 11/1464 |
| 11,249,869 B1* | 2/2022 | Gupta | G06F 11/2064 |
| 11,640,241 B2* | 5/2023 | Venkatanarayanan | G06F 3/0613 711/154 |
| 2003/0004950 A1* | 1/2003 | Wils | H04L 67/06 |
| 2003/0056063 A1* | 3/2003 | Hochmuth | H04L 67/1097 711/152 |
| 2003/0084209 A1* | 5/2003 | Chadalapaka | G06F 3/0664 711/111 |
| 2003/0188218 A1* | 10/2003 | Lubbers | G06F 11/2079 714/5.11 |
| 2005/0033888 A1* | 2/2005 | Qi | G06F 3/0661 710/200 |
| 2007/0022314 A1* | 1/2007 | Erasani | H04L 41/0893 714/4.1 |
| 2007/0028068 A1* | 2/2007 | Golding | G06F 3/067 711/170 |
| 2007/0061454 A1* | 3/2007 | Lee | H04L 67/1097 709/225 |
| 2007/0079062 A1* | 4/2007 | Miyawaki | G06F 3/067 711/112 |
| 2008/0034167 A1* | 2/2008 | Sharma | G06F 3/0622 711/152 |
| 2008/0059733 A1* | 3/2008 | Otani | G06F 11/1458 711/162 |
| 2014/0115182 A1* | 4/2014 | Sabaa | H04L 67/1097 709/232 |
| 2015/0317254 A1* | 11/2015 | Candelaria | G06F 3/06 711/163 |
| 2022/0334775 A1* | 10/2022 | Stotski | G06F 3/0644 |
| 2024/0244105 A1* | 7/2024 | Sivakumar | H04L 67/1012 |
| 2024/0249031 A1* | 7/2024 | Levy | G06F 21/78 |

OTHER PUBLICATIONS

Zhu et al., "A SCSI3 Persistent Reservation Synchronization Solution for iSCSI Targets Cluster Hosting Ceph RBD with Active/Active Connections," IEEE 4th Information Technology, Networking, Electronic and Automation Control Conference (ITNEC 2020), 2020, pp. 1785-1793.

NetApp, "What are SCSI Reservations and SCSI Persistent Reservations?" NetApp Kmowledge Base, 2022, 27 pages, retrieved from https://kb.netapp.com/onprem/ontap/da/SAN/What_are_SCSI_Reservations_and_SCSI_Persistent_Reservations.

Seagate, "Cloud Compute and Cloud Storage Architectures," Seagate, 2023, 14 pages, retrieved from https://www.seagate.com/blog/cloud-compute-and-cloud-storage-architecture-master-ti/.

* cited by examiner

ALLOCATING SESSIONS ASSOCIATED WITH EXCLUSIVE ACCESS TO DIFFERENT FIBERS OF A STORAGE TARGET

BACKGROUND

The present invention relates to cloud computing and cloud storage, and more specifically, this invention relates to allocating sessions associated with exclusive access to different fibers of a storage target.

Cloud computing and cloud storage have become one preferred method for delivering information and online functionality. While some cloud services focus on providing consumers with a broad range of services and functionalities, including e-tail shopping, research, social media networking, entertainment consumption and protecting important digital documents, other cloud services focus on small businesses, large enterprises, governments and other institutions. Various cloud services provide cloud storage and processing capability to consumers at no charge, while others charge some type of subscription-based fee. There are also private clouds that are owned and controlled by an organization, providing a secure network for sharing critical software and data. For example, hospitals can choose to use public archiving services for electronic medical records (EMR) and patient image data, or create their own cloud archive solution.

Software as a service (SaaS) cloud solutions include file, document, music, photo and video sharing, backup/restore, DC and DR, along with archiving capabilities. Other cloud computing options include database, big data analytics (including map-reduce based services), cloud drives and other applications exploiting back-end cloud storage. The cloud solutions also extend to products and solutions used for deploying public, private and hybrid clouds.

SUMMARY

A computer-implemented method, according to one embodiment, includes receiving, from a plurality of initiators, a plurality of reservation requests for logical unit numbers (LUNs) of a storage target. Exclusive type network paths between the initiators and the LUNs requested in the reservation requests are caused to be added to a restricted path list. The method further includes determining, from a predetermined LUN mapping database, the initiators of the plurality of initiators, that have access to at least one of the exclusive type network paths in the restricted path list. Session logout commands are caused to be sent to the determined initiators. The session logout commands instruct the determined initiators to thereafter re-log in to sessions that are logged out of as a result the determined initiators adhering to the session logout commands. The method further includes allocating a first session that a first of the determined initiators re-logs in to, to a first fiber of the storage target. The first fiber serves as an exclusive type network path between the first determined initiator and a first of the LUNs, and the first LUN is requested by the first determined initiator in a first of the reservation requests.

A computer program product, according to another embodiment, includes a computer readable storage medium having program instructions embodied therewith. The program instructions are readable and/or executable by a computer to cause the computer to perform the foregoing method.

A system, according to another embodiment, includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
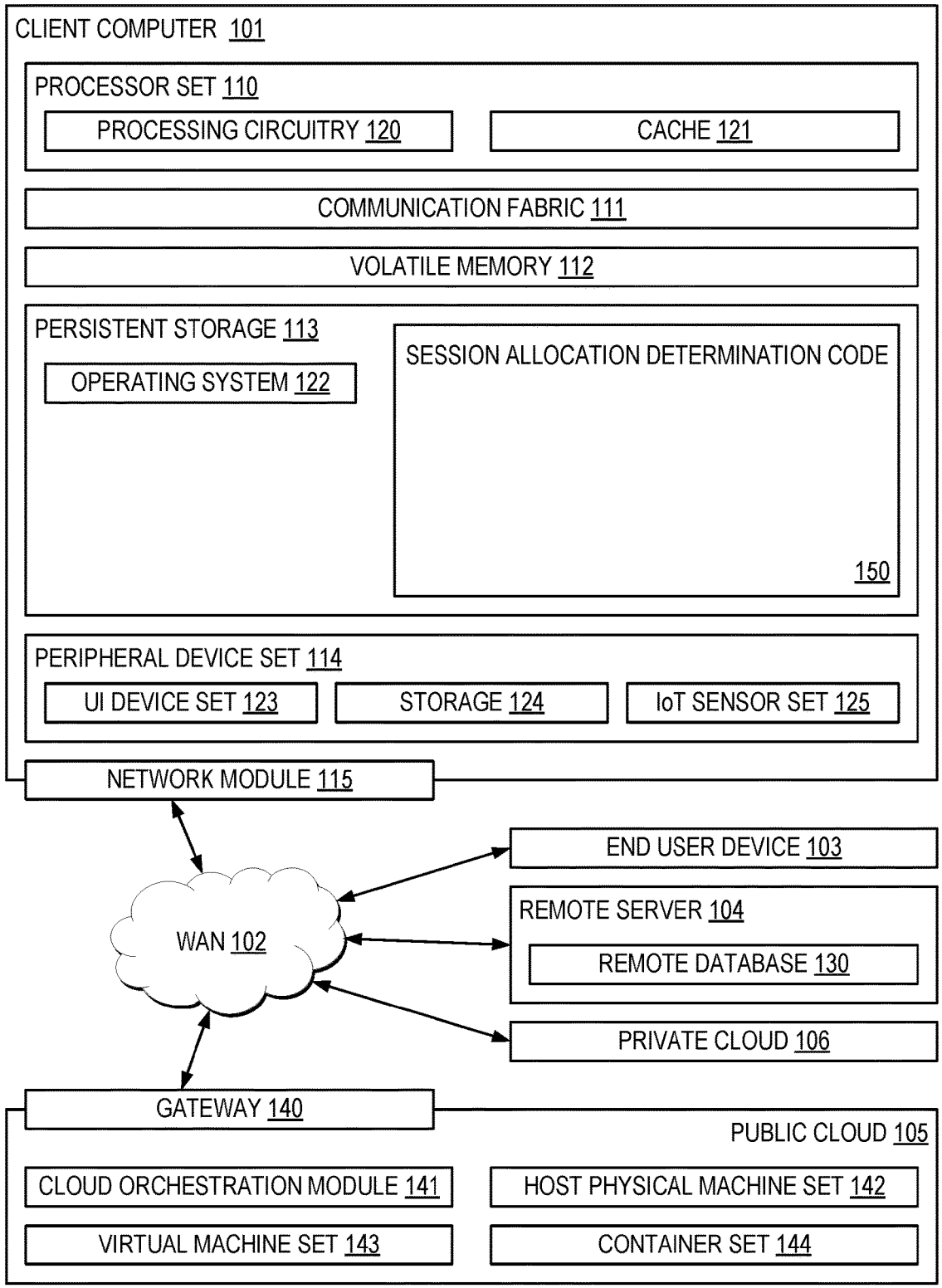
FIG. 1 is a diagram of a computing environment, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for allocating sessions associated with exclusive access to different fibers of a storage target.

In one general embodiment, a computer-implemented method includes receiving, from a plurality of initiators, a plurality of reservation requests for logical unit numbers (LUNs) of a storage target. Exclusive type network paths between the initiators and the LUNs requested in the reservation requests are caused to be added to a restricted path list. The method further includes determining, from a predetermined LUN mapping database, the initiators of the plurality of initiators, that have access to at least one of the exclusive type network paths in the restricted path list. Session logout commands are caused to be sent to the determined initiators. The session logout commands instruct the determined initiators to thereafter re-log in to sessions that are logged out of as a result the determined initiators adhering to the session logout commands. The method further includes allocating a first session that a first of the determined initiators re-logs in to, to a first fiber of the storage target. The first fiber serves as an exclusive type network path between the first determined initiator and a first of the LUNs, and the first LUN is requested by the first determined initiator in a first of the reservation requests.

In another general embodiment, a computer program product includes a computer readable storage medium having program instructions embodied therewith. The program instructions are readable and/or executable by a computer to cause the computer to perform the foregoing method.

In another general embodiment, a system includes a processor, and logic integrated with the processor, executable by the processor, or integrated with and executable by the processor. The logic is configured to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as session allocation determination code of block 150 for allocating sessions associated with exclusive access to different fibers of a storage target. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

As mentioned elsewhere above, cloud computing and cloud storage have become one preferred method for delivering information and online functionality. While some cloud services focus on providing consumers with a broad range of services and functionalities, including e-tail shopping, research, social media networking, entertainment consumption and protecting important digital documents, other cloud services focus on small businesses, large enterprises, governments and other institutions. Various cloud services provide cloud storage and processing capability to consumers at no charge, while others charge some type of subscription-based fee. There are also private clouds that are owned and controlled by an organization, providing a secure network for sharing critical software and data. For example, hospitals can choose to use public archiving services for electronic medical records (EMR) and patient image data, or create their own cloud archive solution.

Software as a service (SaaS) cloud solutions include file, document, music, photo and video sharing, backup/restore, DC and DR, along with archiving capabilities. Other cloud computing options include database, big data analytics (including map-reduce based services), cloud drives and other applications exploiting back-end cloud storage. The cloud solutions also extend to products and solutions used for deploying public, private and hybrid clouds.

In order to arrange for a device and/or an application to interact with a target device in a cloud environment, e.g., access data stored in cloud storage, upload data to cloud storage, perform compute operations using cloud storage resources, etc., reservations may be transmitted from the device and/or applications to the target device. In some deployments, these reservations include Small Computer System Interface (SCSI) reservations and SCSI-3 Persistent Reservations. For context, SCSI reservations are used to control access to a shared SCSI device such as a disk or tape drive. Such a reservation requesting device, referred to herein as an "initiator" sets a reservation on a logical unit number (LUN) to prevent another initiator from making changes to the LUN. This is similar to a file-locking concept. SCSI reservations are always set by a host initiator. Ideally, the same initiator performs a SCSI release on the affected LUN.

The mechanics of SCSI reservations are specified in SCSI protocols. As specified in these protocols, reservations are used to control access to a device. The SCSI-3 Primary Commands specification provides for a modern approach to reservations known as persistent reservations. Persistent reservations add an ability for the reservation to persist even if the bus is reset for error recovery. These are set using the SCSI "Persistent Reserve Out" and "Persistent Reserver IN commands". If a classic reservation is placed on a device, all subsequent persistent reservation requests will fail until a classic release is performed.

In typical cloud deployments, there are relatively many edge devices connected directly to the edge cloud. These connections enable the edge devices to use the edge cloud facilities for data transmission from edge collectors, which are then further used for the various computations. In some use cases, it is relatively common for edge sensors that continually generate data after regular time intervals to then send the data to edge cloud application instances where the data is processed. Another example of a use case includes edge devices that compute outcomes, and send the data to a backbone of the cloud. A first place for data consumption may be the edge cloud where the data is stored and then further managed depending on predetermined cloud policies.

Furthermore, in some deployments of cloud-based storage systems that offer storage space, the storage space may be dedicatedly managed by storage engines and utilized by applications that connect to the storage instances via available connectivity protocols like iSCSI/NVMe-TCP, iWARP, RoCE, etc. These instances allow multiple applications to connect and leverage the benefits of storage controllers like deduplication, relatively high availability and storage tiering, which help improve the performance of applications. Additionally, these instances are one of the key elements of data center technologies when used as physical bare metal hardware infrastructure in that the instances offer relatively high performance storage access to host applications.

For cloud-based data transmission from edge devices, ethernet is relatively popularly used and is a feasible option because it provides flexibility as well as reliability with respect to processing. In instances in which the initiators use ethernet for a connectivity option, generally the devices connect the target service in the edge via multiple paths. This allows a relatively high availably network to be established between the service and the edge device.

It is a relatively common scenario that multiple host applications access the same target disk (virtual disk) for read/write purposes. For example, business applications and analytics applications may access the same disk for different purposes. In this case, it is important to ensure that the data on the disk is prevented from being corrupted because there is more than one device and/or application that is accessing the data. SCSI based disk reservations allow host applications to avoid these data loss situations by exclusively reserving the paths for defined purposes. This allows paths to be reserved for read or write operations with exclusive or non-exclusive access, depending on the reservation type. This in turn allows for improvements to application data workload validities, in order to avoid data corruption at the target.

In the situation discussed above, there may be multiple sessions created from various applications to the same disk (LUN) in the virtualization space. When any connection is established, the processing service at the target allocates a CPU core for the connection from where the I/O packets are transferred. These cores may generally be called "fibers". Fiber binding is performed per a connection basis at a time that connection requests are received. When the connections are established, the target has no understanding about the SCSI PR execution because the PR commands will be received after the CPU core is allocated. Accordingly, in conventional deployments, CPU cores are allocated without any knowledge of additional attributes. This often leads to a CPU core workload imbalance. Instead of considering such attributes, conventional techniques instead include generally allocating the fibers in round robin fashion.

With continued reference to the conventional techniques described above, in some cases, an application may have an exclusive access policy that allows reads and writes to be performed from only one path. This means that, during the exclusive access, no I/O workloads are expected on the other paths to same LUN. Even when there is no I/O expected, the fiber allocator does not consider this fact at all, and instead allocates the fibers in round robin fashion. Due to this, the other application initiators, which are performing relatively greater workloads, may have sessions overlapped to certain fibers. This ultimately creates a system imbalance which degrades the performance of the applications because relatively less network packets are processed due to overloaded fibers.

In sharp contrast to the imbalance deficiencies described above, the embodiments and approaches described herein provide techniques that work with the network connection CPU and fiber allocation logic at network endpoints to locate SCSI persistent reservations while allocating the paths for sessions. Because the path allocation is performed at a relatively earlier stage at which the SCIS reservations and the access policies are not defied, these techniques ensure that the conditions that create the imbalances described above are avoided. For example, this is ensured by locating the SCSI persistent reservation routes, analyzing the type of reservation requested by the initiator to the LUN, identifying other initiator access policies from a LUN mapping database of the target device, and making realignment decisions for fibers depending on the access type and workload estimation.

Figure 2:
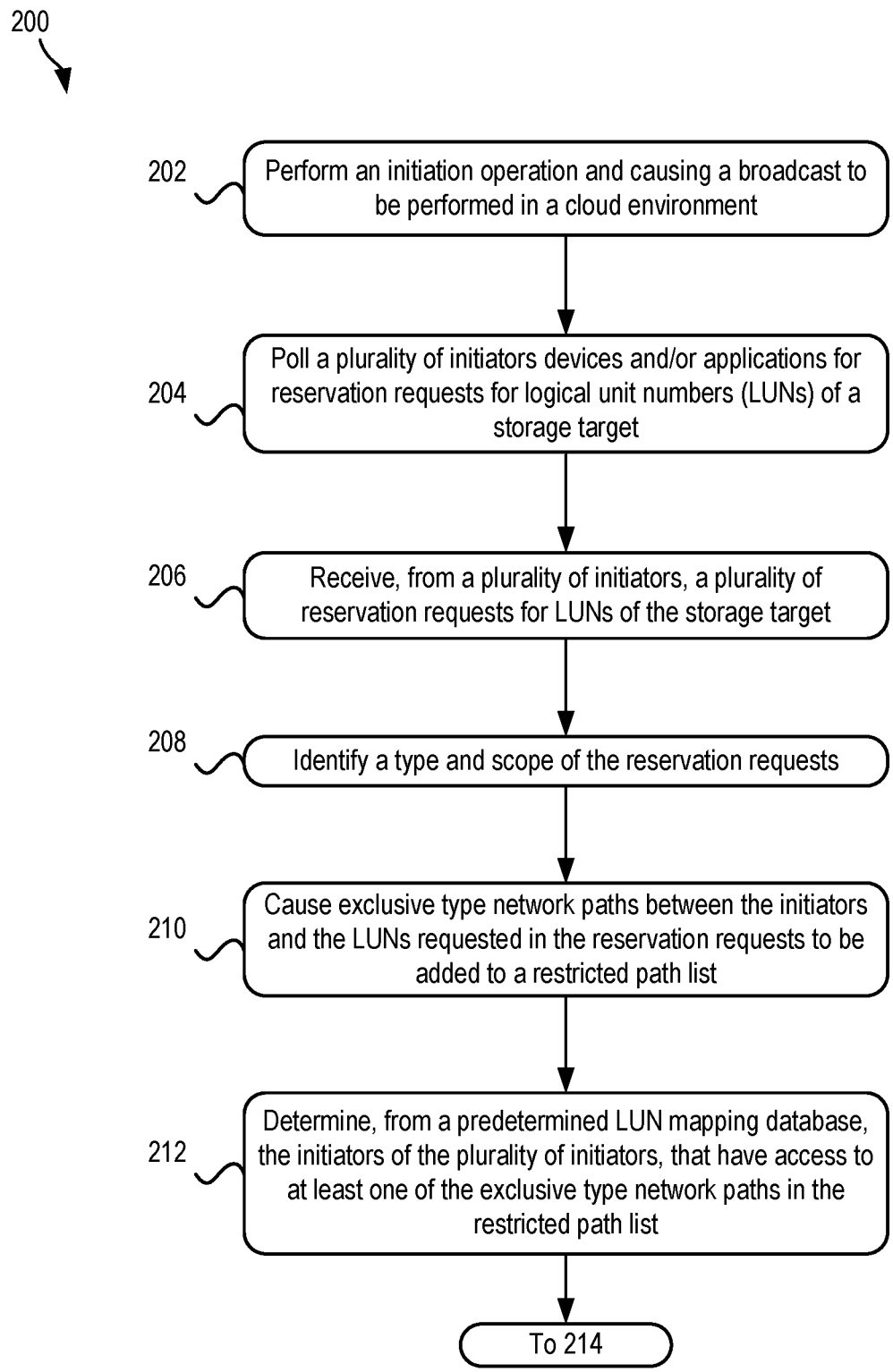
FIG. 2 is a flowchart of a method, in accordance with one embodiment of the present invention.
Figure 2:
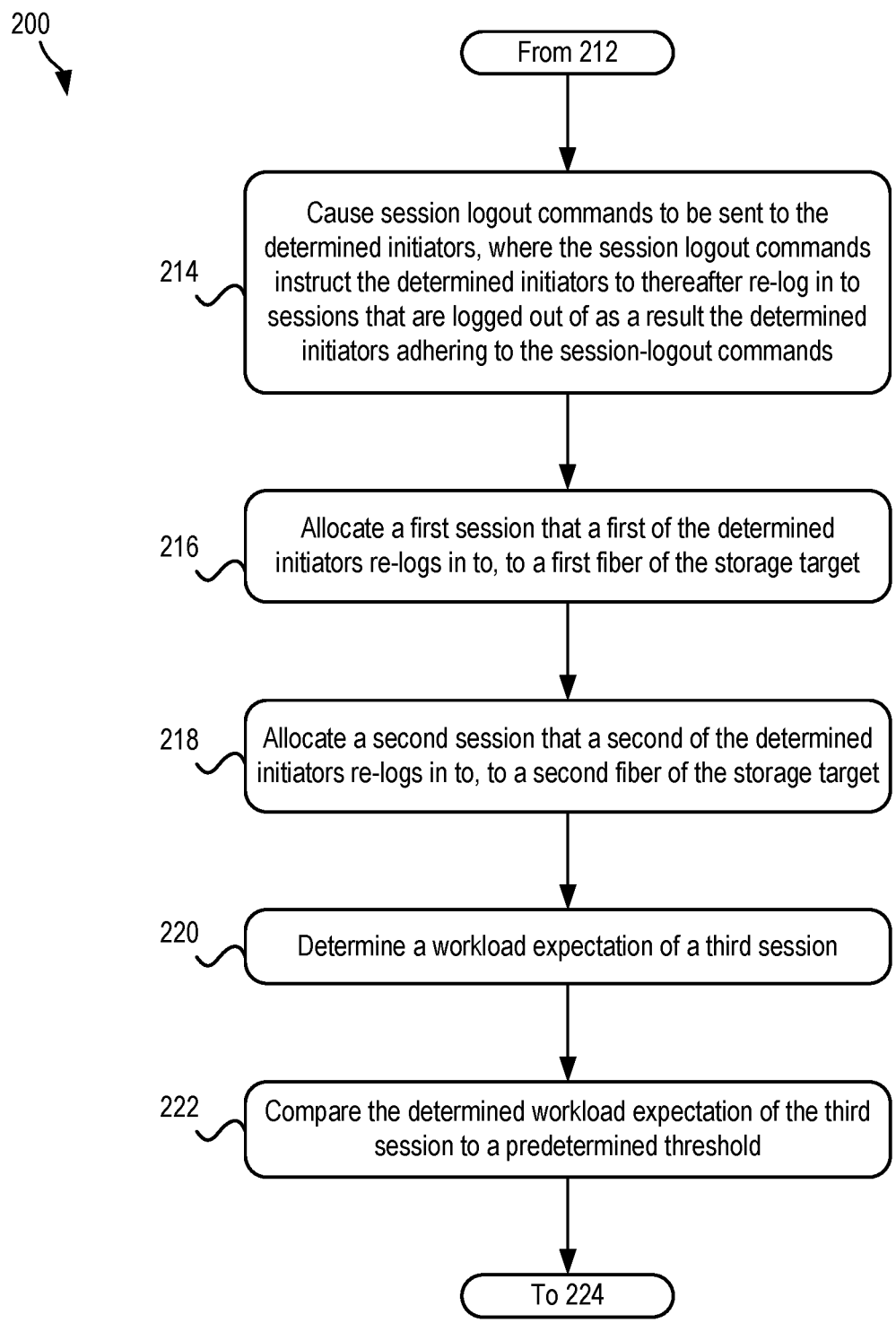
Figure 2:
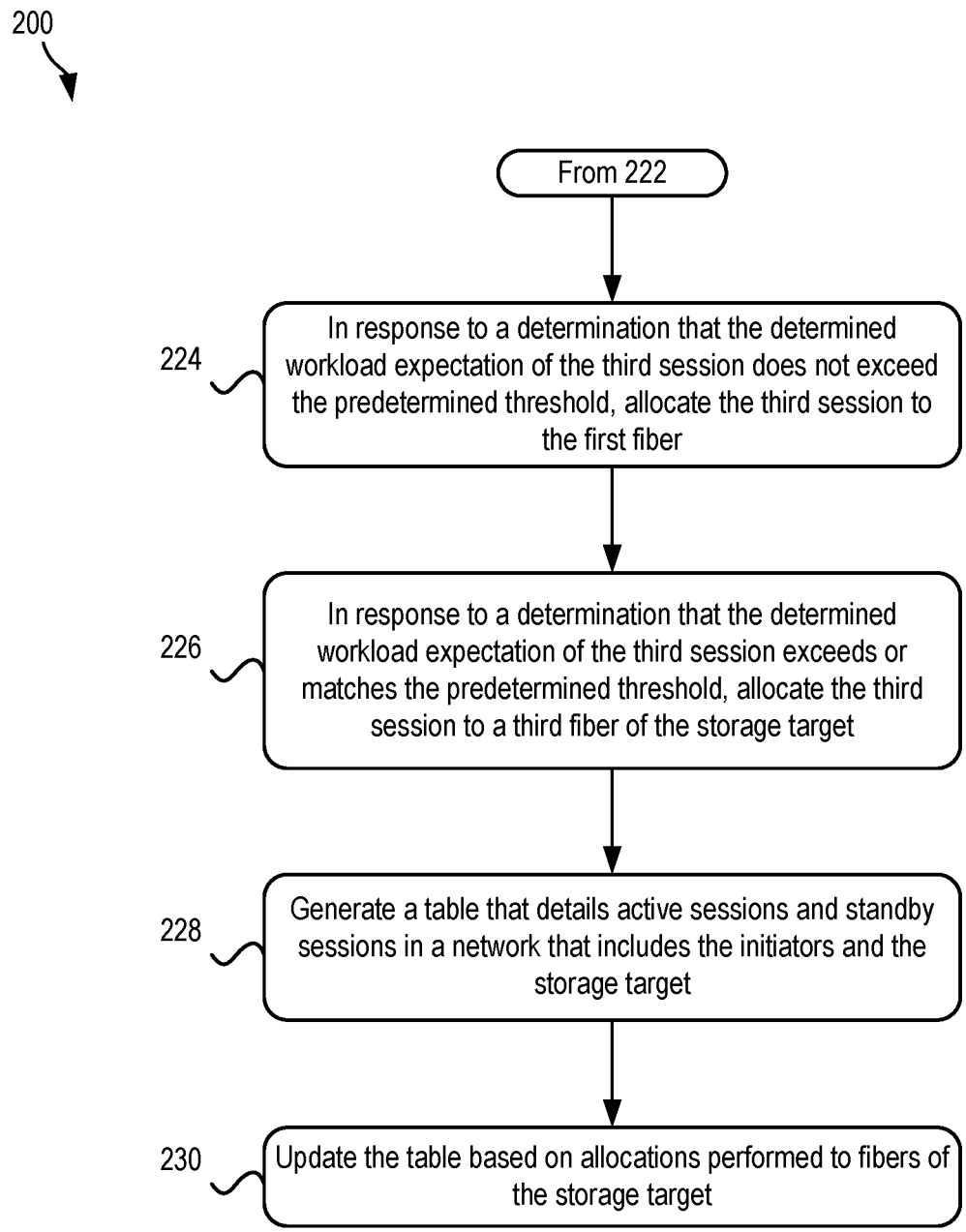

Now referring to FIG. 2, a flowchart of a method 200 is shown according to one embodiment. The method 200 may be performed in accordance with the present invention in any of the environments depicted in FIGS. 1-3, among others, in various embodiments. Of course, more or fewer operations than those specifically described in FIG. 2 may be included in method 200, as would be understood by one of skill in the art upon reading the present descriptions.

Each of the steps of the method 200 may be performed by any suitable component of the operating environment. For example, in various embodiments, the method 200 may be partially or entirely performed by a computer, or some other device having one or more processors therein. The processor, e.g., processing circuit(s), chip(s), and/or module(s) implemented in hardware and/or software, and preferably having at least one hardware component, may be utilized in any device to perform one or more steps of the method 200. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that the operations of method 200 may, in some approaches, be performed by a target, e.g., such as a storage target, in an environment that includes at least the target and a plurality of initiators. Note that the environment may be a cloud environment, in some preferred approaches. At least one of the initiators of the environment may be an edge device located at a first location, and the storage target may be an edge cloud storage device located at a second location that is different than the first location.

The storage target may include a virtualization manager that is configured to realign fibers and/or the target may be in communication with a fiber realignment component that is configured to perform fiber realignments. Accordingly, in some other approaches, the operations of method 200 may alternatively be performed by the fiber realignment component. The invention process may be running in the storage target and (optionally in initiator) locations in conjunction with SCSI persistent reservation handler and polls for the reservation request from the initiator. Furthermore, in some approaches, the storage target includes a target pool which may include one or more disks, LUNs, and/or other storage modules of a type that would become apparent to one of ordinary skill in the art after reading the descriptions herein. The fibers may serve as network paths between the initiators and the LUNs, in some preferred approaches. In other words, sessions that the initiators log in to may be allocated a fiber that enables access to one of the LUNs. The environment may additionally and/or alternatively include a plurality of applications and/or devices, e.g., that are the initiators. For example, the devices may include, e.g., a cellular phone, wearable devices with wireless capabilities, a thermometer, a computer, a processing circuit, etc., and are preferably able to communicate with the storage target. The applications may be of a type that that would become apparent to one of ordinary skill in the art after reading the descriptions herein. In one example, the applications may be configured to ongoingly perform a read, e.g., such as a temperature of a predetermined location, and upload the reading to the storage target.

Operation 202 includes optionally performing an initiation operation and causing a broadcast to be performed in a cloud environment that includes the initiators and the storage target. For example, in some approaches, a process that includes the operations of method 200 may be running in the storage target, and in response to a determination that at least one of the initiators provides a location of itself, the broadcast may be caused to be performed. In some approaches, cloud platform message queue PLMQ (a message passing mechanism between two processes/devices) information may be broadcasted in the environment. In some other approaches, the broadcast may additionally and/or alternatively include information that specifies that the storage target is active and ready to receive reservation requests.

In some approaches, the initialization process may include one or more data structures being loaded from a cluster state machine and memory locations that are initialized. A LUN mapping database (LMD) may additionally and/or alternatively be enquired from cloud service management (CSM), and a copy may be maintained at a process level. In some approaches, a semantics constrained net (SCN) and/or registered state change notification (RSCN) may be initiated to make a synchronous update to local LMD.

Operation 204 includes polling a plurality of initiators, which may include the devices and/or applications, for reservation requests for LUNs of the storage target. In some approaches, the polling may include outputting a message to the initiators that indicates that the storage target is capable of receiving reservation requests. In some deployments, a SCSI persistent reservation (PR) handler of a type that would become apparent to one of ordinary skill in the art after reading the descriptions herein may be notified via PLMQ which may be configured to locate and start polls for reservation requests from one or more of the initiators.

At least one reservation request may be received from at least one of the initiators. Accordingly, it should be noted that although various of the descriptions described herein are described from the perspective of processing a plurality of reservation requests that are received at the storage target, in some other approaches, the operations described herein may be performed for a single reservation request that is received.

In some approaches, a plurality of reservation requests for at least one of the LUNs of the storage target are received, e.g., see operation 206. In some approaches, the reservation requests may originate from one or more of the initiators and be sent by the initiators to the storage target. In some other approaches, the reservation requests are collected at a first of the initiators, e.g., that has relatively more processing potential than other ones of the initiators that are associated with at least one of the received reservation requests. In such an approach, each of the reservation requests may be received from the first initiator.

Furthermore, in some approaches, subsequent to receiving the reservation requests, the storage target may output the reservation requests to the fiber realignment component where the reservation requests may be processed by a PR management module of the fiber realignment component.

In some approaches, in response to receiving a registration request, a polling thread may be initiated for a reservation command. More specifically, in some approaches, in response to a determination that a reservation command is received from the target and processed by the PR manager, a determination may be made as to whether the reservation request is an SCSI PR request, and/or whether the reservation request is approved. Note that such approval may, in some approaches, be based on whether the reservation request is expected to be granted to the respective path. Various approaches for determining whether to approve a reservation request are detailed below.

Before sending an acknowledgement to a reservation response output module and/or the initiators that sent the reservation requests, in some approaches, a predetermined fiber realignment process may be invoked in order to determine information about the reservation request to ensure that exclusive type reservation requests are not fulfilled using a fiber that other workloads are being performed on. This predetermined fiber realignment process may, in some approaches, include identifying a type and/or scope of the reservation requests, e.g., see operation 208. The type and/or scope of the reservation requests may, in some approaches, be determined using a polling thread for the reservations commands that is made available to the initiators. In some other approaches, the received reservation requests may additionally and/or alternatively be analyzed, e.g., using natural language processing (NLP) and/or any other techniques for analyzing a reservation request that would become apparent to one of ordinary skill in the art after reading the descriptions herein. In some preferred approaches, this identification step may be performed by a predetermined PR manager component to determine whether a type of one or more of the received requests are an exclusive type of request, e.g., a PR request. The scope of the reservation requests may include, e.g., a workload expectation that is associated with a given one of the requests, an estimated amount of time that fulfilling an operation will take to perform once an associated one of the reservation requests is confirmed, etc. The determined type and/or scope of the reservation requests may be used for realignment, as will be described in greater detail elsewhere herein. Some other types of reservation requests that may be identified include, e.g., write exclusive, write shared, read exclusive, read shared, etc.

For at least some types of reservation requests, e.g., exclusive type reservation requests, in response to a determination that the request is to be approved and/or a reservation is expected to be granted to a respective path, a reservation confirmation may be output to the requesting initiator. However, in some preferred approaches, prior to any confirmation responses being sent out to one or more of the initiators, a predetermined fiber realignment process may be performed, as described below. For context, for reservation requests that are identified to have a need for an exclusive type access to a LUN, exclusive type network paths, e.g., a first fiber that serves as an exclusive type network path between the requesting initiator and a requested one the LUNs, should be ensured to be made available for fulfilling the request. This way, other initiators are not provided access to the requested LUN for read and/or write purposes while the requested LUN is being accessed by the requesting initiator. Otherwise, providing a second initiator access to the first LUN for read and/or write purposes while a first of the initiators is using the first LUN for exclusive access operations such as writing to the first LUN, would likely result in corrupted data.

Operation 210 includes causing exclusive type network paths between the initiators and the LUNs requested in the reservation requests to be added to a restricted path list. This way, allocation of the exclusive type network paths may be reserved and selectively allocated to initiators associated with reservation requests that request exclusive access for network paths to a given one of the LUNs. In some approaches, generation of the restricted path list may be based on the analysis of the type and scope of the received reservation requests. For example, a determination may be made as to whether any of the received reservation requests are of a type of reservation request that requests exclusive access to certain network paths to one of the LUNs. In response to a determination that none of the reservation requests requested exclusive access to certain network paths to one or more of the LUNs, sessions may be allocated to one or more of the fibers of the storage target to allow access to the LUNs. In contrast, in some approaches, in response to a determination that at least one of the reservation requests is a request for exclusive access to certain network paths to one or more of the LUNs, the restricted path list may be derived. A process for deriving the restricted path list may include, in response to a determination that at least one of the reservation requests is a request for exclusive access to certain network paths to one or more of the LUNs, locating initiators from a predetermined LUN mapping database to determine access capability paths that exist in the cloud environment. For example, the attached CPU fabrics to the paths created for LUNs may, in some approaches, be located and used to isolate the core allocation for the LUNs for respective paths. Once the initiator entities are located, the network paths to all initiators are located which are excusive paths for a requested disk and/or LUN from all the possible targets may be determined. These determined network paths are added as information that defines the restricted path list.

In some approaches, a reservation response is sent to one of more of the initiators acknowledging that an associated reservation request is a success, e.g., has been successfully received, has been received and an allocation that satisfies the request is scheduled to be made, etc.

Operation 212 includes determining, from a predetermined LUN mapping database, the initiators of the plurality of initiators, that have access to at least one of the exclusive type network paths in the restricted path list. These initiators are hereafter referred to as the "determined initiators". For context, the determined initiators of the plurality of initiators, that have access to at least one of the exclusive type network paths in the restricted path list may currently be able to access one of the restricted paths. These current access allocations may therefore, in some approaches, prevent exclusive type reservation requests of the plurality of received reservation requests from being fulfilled. Accordingly, in order to ensure that the determined initiators do not disrupt the exclusive type reservation requests from being fulfilled, method 200 may include causing session logout commands to be issued. For example, operation 214 includes causing session logout commands to be sent to the determined initiators. In some preferred approaches, the session logout commands instruct the determined initiators to thereafter re-log in to sessions that are logged out of as a result the determined initiators adhering to the session logout commands. This way, as the determined initiators re-log in to sessions, an allocation of the sessions may be controlled to ensure that initiators that sent exclusive type reservation requests are each provided with an exclusive type network path between the requesting initiator and one of the LUNs that the requesting initiator requests access to.

In some preferred approaches, for all of the network paths in the restricted list, a special session logout command is sent to the initiator that requests that the initiator re-log in for fiber alignment. Once this command is received by the initiator, the initiator preferably logs out and then re-logs in to the session. The storage target may, in some approaches, be caused, e.g., instructed to maintain records for initiator path information while sending special session logout commands.

The records may, in some approaches, be used to map incoming sessions. For example, at least some incoming sessions may be located as standby sessions, because a reservation may already be active on another network path that the incoming session would otherwise be assigned to. Furthermore, in some approaches, sessions that the determined initiators re-log in to may be allocated to fibers of the storage target that are determined to have relatively very low (to no) workload expectations on the session. For example, in some approaches, a first session that a first of the determined initiators re-logs in to may be allocated to a first fiber of the storage target, e.g., see operation 216. In at least some of these approaches, the first fiber serves as an exclusive type network path between the first determined initiator and a first of the LUNs. Furthermore, for context, the first LUN is preferably requested by the first determined initiator in a first of the reservation requests. Based on this allocation, a session of the first initiator is allocated to a fiber, e.g., that enables exclusive access to the first LUN. More specifically, in some preferred approaches, this "exclusive access" is defined as the first initiator being the only initiator that has read and write privileges of the first LUN for a duration of time that the session of the first initiator is allocated to the first fiber. This allocation process may be described as a controlled "fiber alignment" process.

Similar to the allocation of the first session described above, method 200 may additionally and/or alternatively include allocating a second session that a second of the determined initiators re-logs in to, to a second fiber of the storage target, e.g., see operation 218. The second fiber may be configured to serve as an exclusive type network path between the second determined initiator and a second of the LUNs, and the second LUN may be the LUN that is requested by the second determined initiator in a second of the reservation requests. It should be noted that, as a result of the first session being allocated to the first fiber of the storage target, and the second session being allocated to the second fiber of the storage target, two exclusive type reservation requests are aligned in a way that ensures that more than one exclusive type reservation request is not fulfilled using the same fiber. This increases performance of the cloud environment, and particularly the storage target because otherwise allocating the first session and the second session to the same fiber of the storage target at the same time would result in the imbalance deficiencies described elsewhere above in addition to data of the LUN being corrupted based on more than one device and/or application, e.g., more than one initiator, being allowed to concurrently access the data. One illustrative example of such an imbalance being avoided may be based on a case where the second session was previously allocated to the first fiber before the session logout command is sent to the second initiator. In this case, in the event that the logout commands were not otherwise issued, a fulfillment of an exclusive type reservation request that involved allocation to the first fiber would otherwise result in an over allocation being performed on the first fiber.

Further exclusive type reservation requests are preferably not fulfilled using the first fiber while the first initiator is using the first fiber for the exclusive access. Moreover, further exclusive type reservation requests are preferably not fulfilled using the second fiber while the second initiator is using the second fiber for an exclusive access. Accordingly, in some approaches, method 200 may include performing additional allocations based on the identified type and/or scope of the reservation requests. For example, in some approaches, method 200 includes determining a workload expectation of a third session, e.g., see operation 220. In some approaches, the third session is re-logged in to by a third of the initiators. This determination may, in some approaches, determine whether the third session is re-logged in to by one of the determined initiators, e.g., an initiator that send an exclusive type reservation requests. In response to a determination that the third session is re-logged in to by one of the determined initiators, the workload expectation of the third session may be determined to include at least one read operation and/or at least one write operation. In contrast, a workload expectation of the third session may be determined to not include at least one read operation and/or not include at least one write operation, e.g., thereby defining a relatively low workload expectation or a workload expectation or no work.

Operation 222 includes comparing the determined workload expectation of the third session to a predetermined threshold. In some preferred approaches, the predetermined threshold is one read operation being performed on the first LUN. In another approach, the predetermined threshold is one write operation being performed on the first LUN. In other words, the predetermined threshold does not allow a session with a workload expectation that includes any read or write operations to be allocated to the first fiber, for at least a period of time that the first session is allocated to the first fiber. For example, in response to a determination, e.g., from results of the comparison, that the determined workload expectation of the third session does not exceed the predetermined threshold, the third session is optionally allocated to the first fiber, e.g., see 224. In some other approaches, in response to a determination, e.g., from results of the comparison, that the determined workload expectation of the third session does not exceed the predetermined threshold, the third session is optionally queued for allocation to the first fiber, e.g., allocated to the first fiber once the first session is no longer using the first fiber. For example, the third session may be classified as a standby session that may, in some approaches, be allocated to the first fiber in response to a determination that the first session is no longer allocated to the first fiber. In contrast, in some other approaches, the method 200 may additionally and/or alternatively include allocating the third session to a third fiber of the storage target in response to a determination, e.g., from results of the comparison, that the determined workload expectation of the third session exceeds or matches the predetermined threshold, e.g., see operation 226. In one or more of such approaches, the third fiber serves as a network path to a third of the LUNs which may be a LUN that is requested by an initiator that is logged in to the third session.

In some approaches, method 200 includes generating a table that details the sessions in a network that includes the initiators and the storage target, e.g., see operation 228. For example, the table may be caused, e.g., have information maintained, to detail active sessions within the network, e.g., sessions currently assigned to one of the fibers of the storage target. The table may additionally and/or alternatively be caused, e.g., have information maintained, to detail standby sessions within the network, e.g., sessions not currently assigned to one of the fibers of the storage target. For example, standby sessions may include sessions that are not allocated to one of the fibers but are queued to be allocated to one of the fibers once an exclusive access of the fiber is withdrawn. The table is preferably ongoingly maintained. For example, method 200 preferably includes updating the table based on allocations performed to fibers of the storage target, e.g., see operation 230. In another approach, in response to a session being created, e.g., on every SESSION_CREATE command, the table may be used to ensure that the fiber allocation considers only active session counts to avoid active sessions from overlapping.

The operations described above are applicable for and may be used with any network devices using path reservation policies. For simplicity, various approaches described herein are described from the illustrative perspective of a storage initiator and a storage target, however, these techniques may additionally and/or alternatively be applied to any two network entities connected over multiple paths to reach each other, and may trigger workload reservations to avoid data corruption. Furthermore, these techniques may be independent of protocols used and may be extended to any existing networking protocol to enable relatively improved discoverability and usage in the networking industry.

Various benefits are enabled as a result of deploying the techniques described herein in a cloud environment. For example, relatively efficient resource utilization is enabled at the endpoints in the network that includes the initiators and the storage target because exclusive type use of the fibers is distributed across the fibers rather than an overallocation being allowed to occur on one or more of the fibers. This leads to relatively more performance during read and/or write packet transmission because the packets are processed by a correct set of threads at both endpoints. Consistent performance is also gained with efficient resource allocation at the cloud initiator and target systems. During testing, the techniques described herein also resulted in packet drops being avoided at various networking entities, as well as a reduction in congestion throughout a backbone of the cloud network. Retransmission and packet drops at an application layer are also avoided as a result of the techniques described herein considering the digestive capability of host and application levels. All of these benefits result in increased performance throughout the cloud environment as the imbalance deficiencies described elsewhere above are avoided using the techniques described herein.

Figure 3:
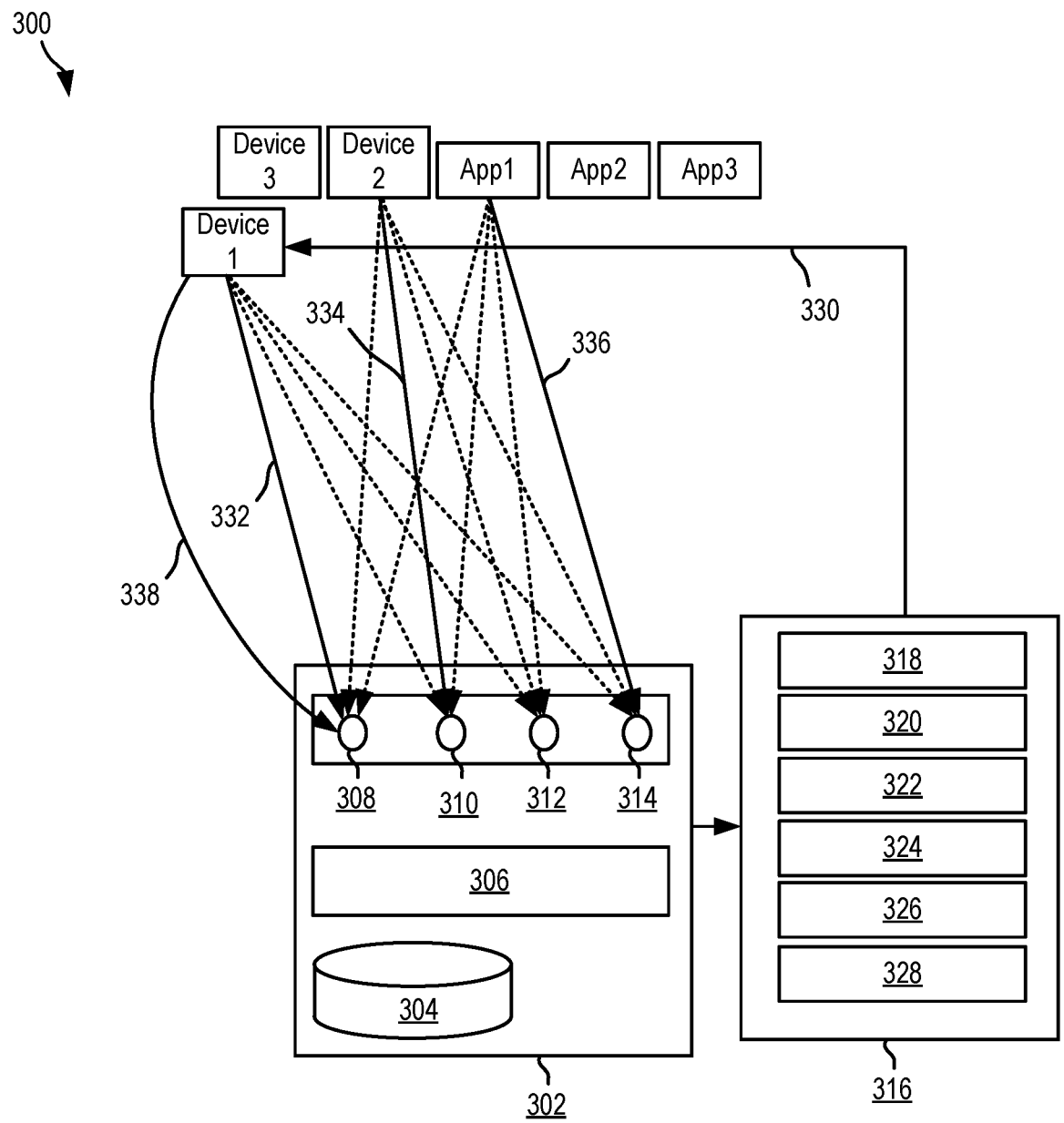
FIG. 3 is a cloud environment, in accordance with one embodiment of the present invention.

FIG. 3 depicts a cloud environment 300, in accordance with one embodiment. As an option, the present cloud environment 300 may be implemented in conjunction with features from any other embodiment listed herein, such as those described with reference to the other FIGS. Of course, however, such cloud environment 300 and others presented herein may be used in various applications and/or in permutations which may or may not be specifically described in the illustrative embodiments listed herein. Further, the cloud environment 300 presented herein may be used in any desired environment.

The cloud environment 300 includes a plurality of devices, e.g., see Device 1, Device 2, and Device 3, and a plurality of applications, e.g., see App1, App2, and App3. The cloud environment 300 also includes a storage target 302 that includes a target pool 304, a virtualization manager component 306, and a plurality of fibers 308, 310, 312 and 314. The storage target 302 may be configured to output information and/or commands to a fiber realignment module 316. In some preferred approaches, the fiber realignment module 316 may include a core allocation map 318, an LMD enquiry for reservation paths 320, a path list gathering 322, a path standby activation module 324, special logout to standby path code 326 and a re-log in core allocator 328 that may be configured to be used to perform one or more of the operations described elsewhere herein, e.g., see method 200.

In some approaches, a predetermined process may be running in the storage target and optionally in the location of the devices and/or applications, in conjunction with SCSI persistent reservation handler and polls for reservation request from the devices and/or applications, e.g., where the devices and/or applications that send reservation requests to the storage target are initiators. In response to a determination that at least one registration request is received, e.g., by the storage target, a polling thread may be initiated, in some approaches, for reservation commands. At least one reservation command may be received at the target, which may be processed by a PR manager. In response to a determination that the SCSI PR request is approved and reservation is expected to be granted to the respective path, then before sending an acknowledgment reservation response, a predetermined fiber realignment process may be invoked to let the system understand about the reservation grant. In some approaches, the process analyzing PR manager may be caused to enquire a type and scope of the reservation requests. In response to a determination that the identified type is an exclusive access for certain network paths, it may be determined that other paths cannot have to an associated disk for read/write purpose, even if these paths already have such access. In order to ensure that these path access restrictions are enforced, initiators may be looked up in a predetermined LUN mapping database to determine the initiators that have access capability to the same disk. Once the initiator entities are located, the networked paths to all initiators that are excusive paths for that disk from all the possible targets are determined. This list of paths are preferably ensured to no longer have access to the disk, because one of the reservation requests will be granted to one (or a set of) these path(s). A reservation response is sent to the initiator acknowledging success of the reservation, e.g., see operation 330.

The initiators associated with paths that will be restricted may, in some approaches, be sent a special "session-LOGOUT" command requesting a re-log in for fiber alignment, e.g., see re-log in operation 338. In some approaches, a preferred fabric may be mapped that includes allocated fabric and may trigger the special "session-LOGOUT" command, e.g., ASYNC_LOGO, to the initiator in response to a determination that the allocated fabrics do not match. Furthermore, in some approaches, a driver of the initiator may be configured to understand the special ASYNC_LOGO triggered to rebalance target PRs.

In some preferred approaches, workload information is kept intact even after a session logout and then this information is leveraged for incoming session with same session IDs. For example, in some approaches, allocations of a CPU core or fabric may be performed by an earlier workload mapper to arrange a correct core mapping. Once this command is received by such initiators, the commands are performed, and the initiators thereafter re-log in to an associated one of the sessions. Records are preferably maintained, e.g., by the storage target, for initiator path information while sending the special session-LOGOUT command.

These records may be used to map the incoming sessions. In some approaches, this performed mapping may include allocating some incoming sessions as standby sessions based on a reservation already active on another path, and allocating some of the incoming sessions to the fibers. For example, the dashed lines leading from Device 1, Device 2 and App1 represent standby sessions, while the lines 332, 334 and 336 represent active sessions that are allocated to different fibers of the target. Note that each of the lines 332, 334 and 336 represent active sessions that fulfill exclusive access reservation requests, e.g., SCSI PRs. These sessions are allocated to the fibers with relatively very low (to no) workload expectations on the session in order to provide an exclusive access type for the associated initiators.

In some approaches, one of the reservation requests, e.g., a PR request, may be rejected. For example, the rejection of a PR request may indicate an alternate target LUN path in response to identification that the alternate target LUN path is a relatively more ideal fabric. In some approaches, the initiator may respond in a changed session and a same PR request.

A table that indicates active and standby sessions may be generated and ongoingly updated based on the allocations performed in the cloud environment 300.

These operations performed in cloud environment 300 result in non-overlapping active paths on the same processing fiber to ensure that bottlenecking events are avoided during the fulfillment of reservation requests. Because the active paths are ensured to not overlap as a result of the allocations and/or placement of sessions on standby, in some approaches, a plurality of active paths may be equally distributed to the available processing elements and create an equilibrium situation at a consuming location on the storage target. This increases throughput of the performance of edge devices that are sending data to the storage target, e.g., the initiators.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving, from a plurality of initiators, a plurality of reservation requests for logical unit numbers (LUNs) of a storage target;
   causing exclusive type network paths between the initiators and the LUNs requested in the reservation requests to be added to a restricted path list;
   determining, from a predetermined LUN mapping database, the initiators of the plurality of initiators, that have access to at least one of the exclusive type network paths in the restricted path list;
causing session logout commands to be sent to the determined initiators, wherein the session logout commands instruct the determined initiators to thereafter re-log in to sessions that are logged out of as a result the determined initiators adhering to the session logout commands; and
allocating a first session that a first of the determined initiators re-logs in to, to a first fiber of the storage target, wherein the allocating the first session is based on a determined number of workload operations expected to be performed during the first session, wherein the first fiber serves as an exclusive type network path between the first determined initiator and a first of the LUNs, wherein the first LUN is requested by the first determined initiator in a first of the reservation requests.

2. The computer-implemented method of claim 1, comprising: allocating a second session that a second of the determined initiators re-logs in to, to a second fiber of the storage target, wherein the second fiber serves as an exclusive type network path between the second determined initiator and a second of the LUNs, the second LUN is requested by the second determined initiator in a second of the reservation requests.

3. The computer-implemented method of claim 2, wherein the second session is previously allocated to the first fiber before a first of the session logout commands is sent to the second determined initiator.

4. The computer-implemented method of claim 2, comprising: determining a workload expectation of a third session; comparing the determined workload expectation of the third session to a predetermined threshold; and in response to a determination that the determined workload expectation of the third session does not exceed the predetermined threshold, allocating the third session to the first fiber.

5. The computer-implemented method of claim 4, comprising: in response to a determination that the determined workload expectation of the third session exceeds the predetermined threshold, allocating the third session to a third fiber of the storage target, wherein the third fiber serves as a network path to a third of the LUNs.

6. The computer-implemented method of claim 4, wherein the predetermined threshold is selected from the group consisting of: one read operation being performed on the first LUN, and one write operation being performed on the first LUN.

7. The computer-implemented method of claim 1, wherein the initiators are edge devices located at a first location, wherein the storage target is an edge cloud storage device located at a second location that is different than the first location.

8. The computer-implemented method of claim 1, comprising:
causing a broadcast to be performed in a cloud environment that includes the plurality of initiators and the storage target, the broadcast including information that specifies that the storage target is active and ready to receive reservation requests;
generating a table that details active sessions and standby sessions in a network that includes the initiators and the storage target; and
updating the table based on allocations performed to fibers of the storage target.

9. A computer program product, the computer program product comprising a computer readable storage medium having program instructions embodied therewith, the program instructions readable and/or executable by a computer to cause the computer to:
cause a broadcast to be performed in a cloud environment that includes a plurality of initiators and a storage target, the broadcast including information that specifies that the storage target is active and ready to receive reservation requests;
receive, on the storage target from the plurality of initiators, a plurality of reservation requests for logical unit numbers (LUNs) of the storage target;
cause exclusive type network paths between the initiators and the LUNs requested in the reservation requests to be added to a restricted path list;
determine, from a predetermined LUN mapping database, the initiators of the plurality of initiators, that have access to at least one of the exclusive type network paths in the restricted path list;
cause session logout commands to be sent to the determined initiators, wherein the session logout commands instruct the determined initiators to thereafter re-log in to sessions that are logged out of as a result the determined initiators adhering to the session logout commands; and
allocate a first session that a first of the determined initiators re-logs in to, to a first fiber of the storage target, wherein the allocating the first session is based on a determined number of workload operations expected to be performed during the first session, wherein the first fiber serves as an exclusive type network path between the first determined initiator and a first of the LUNs, wherein the first LUN is requested by the first determined initiator in a first of the reservation requests.

10. The computer program product of claim 9, the program instructions readable and/or executable by the computer to cause the computer to: allocate a second session that a second of the determined initiators re-logs in to, to a second fiber of the storage target, wherein the second fiber serves as an exclusive type network path between the second determined initiator and a second of the LUNs, the second LUN is requested by the second determined initiator in a second of the reservation requests.

11. The computer program product of claim 10, wherein the second session is previously allocated to the first fiber before a first of the session logout commands is sent to the second determined initiator.

12. The computer program product of claim 10, the program instructions readable and/or executable by the computer to cause the computer to: determine a workload expectation of a third session; compare the determined workload expectation of the third session to a predetermined threshold; and in response to a determination that the determined workload expectation of the third session does not exceed the predetermined threshold, allocate the third session to the first fiber.

13. The computer program product of claim 12, the program instructions readable and/or executable by the computer to cause the computer to: in response to a determination that the determined workload expectation of the third session exceeds the predetermined threshold, allocate the third session to a third fiber of the storage target, wherein the third fiber serves as a network path to a third of the LUNs.

14. The computer program product of claim 12, wherein the predetermined threshold is selected from the group consisting of: one read operation being performed on the first LUN, and one write operation being performed on the first LUN.

15. The computer program product of claim 9, wherein the initiators are edge devices located at a first location, wherein the storage target is an edge cloud storage device located at a second location that is different than the first location.

16. The computer program product of claim 9, the program instructions readable and/or executable by the computer to cause the computer to: generate a table that details active sessions and standby sessions in a network that includes the initiators and the storage target; and update the table based on allocations performed to fibers of the storage target.

17. A system, comprising:
a processor; and
logic integrated with the processor, executable by the processor, or integrated with and executable by the processor, the logic being configured to:
cause a broadcast to be performed in a cloud environment that includes a plurality of initiators and a storage target, the broadcast including information that specifies that the storage target is active and ready to receive reservation requests;
receive, on the storage target from the plurality of initiators, a plurality of reservation requests for logical unit numbers (LUNs) of the storage target;
cause exclusive type network paths between the initiators and the LUNs requested in the reservation requests to be added to a restricted path list;
determine, from a predetermined LUN mapping database, the initiators of the plurality of initiators, that have access to at least one of the exclusive type network paths in the restricted path list;
cause session logout commands to be sent to the determined initiators, wherein the session logout commands instruct the determined initiators to thereafter re-log in to sessions that are logged out of as a result the determined initiators adhering to the session logout commands; and
allocate a first session that a first of the determined initiators re-logs in to, to a first fiber of the storage target, wherein the allocating the first session is based on a determined number of workload operations expected to be performed during the first session, wherein the first fiber serves as an exclusive type network path between the first determined initiator and a first of the LUNs, wherein the first LUN is requested by the first determined initiator in a first of the reservation requests.

18. The system of claim 17, the logic being configured to: allocate a second session that a second of the determined initiators re-logs in to, to a second fiber of the storage target, wherein the second fiber serves as an exclusive type network path between the second determined initiator and a second of the LUNs, the second LUN is requested by the second determined initiator in a second of the reservation requests.

19. The system of claim 18, wherein the second session is previously allocated to the first fiber before a first of the session logout commands is sent to the second determined initiator.

20. The system of claim 18, the logic being configured to: determine a workload expectation of a third session; compare the determined workload expectation of the third session to a predetermined threshold; and in response to a determination that the determined workload expectation of the third session does not exceed the predetermined threshold, allocate the third session to the first fiber.

* * * * *